(12) United States Patent
Yuri et al.

(10) Patent No.: US 8,547,810 B2
(45) Date of Patent: Oct. 1, 2013

(54) RECORDING AND REPRODUCING DEVICE, RECORDING AND REPRODUCING METHOD, AND VEHICLE-MOUNTED RECORDING AND REPRODUCING DEVICE

(75) Inventors: Shinsuke Yuri, Hyogo (JP); Yukio Shimizu, Hyogo (JP); Jyun Shimizu, Hyogo (JP); Ichirou Kugou, Hyogo (JP); Chiyohiko Kobayashi, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 1543 days.

(21) Appl. No.: 11/588,269

(22) Filed: Oct. 27, 2006

(65) Prior Publication Data
US 2007/0189726 A1   Aug. 16, 2007

(30) Foreign Application Priority Data
Jan. 27, 2006 (JP) ................. 2006-019462

(51) Int. Cl.
*G11B 5/09* (2006.01)
(52) U.S. Cl.
USPC .. 369/47.3; 369/47.28; 369/189; 369/124.14; 369/267
(58) Field of Classification Search
USPC ............. 369/189, 47.28, 47.29, 47.3, 124.14, 369/267
See application file for complete search history.

(56) References Cited

U.S. PATENT DOCUMENTS

| | | | | |
|---|---|---|---|---|
| 5,802,026 A * | 9/1998 | Tsukihashi | ................ | 369/47.29 |
| 5,953,291 A * | 9/1999 | Yasukohchi et al. | ............ | 710/57 |
| 6,269,061 B1 * | 7/2001 | Shimizume et al. | ......... | 369/47.3 |
| 6,388,959 B1 | 5/2002 | Kondo | | |
| 6,442,327 B1 * | 8/2002 | Yamada et al. | ................. | 386/46 |
| 6,775,212 B2 * | 8/2004 | Takahashi | ................... | 369/47.3 |
| 7,564,744 B2 * | 7/2009 | Sato | ........................ | 369/32.01 |
| 2002/0039334 A1 * | 4/2002 | Yamakawa et al. | ......... | 369/47.4 |
| 2002/0131762 A1 | 9/2002 | Denda et al. | | |
| 2004/0196761 A1 * | 10/2004 | Suetomo et al. | .......... | 369/47.28 |
| 2006/0203622 A1 * | 9/2006 | Arai et al. | ....................... | 369/1 |

FOREIGN PATENT DOCUMENTS

| | | |
|---|---|---|
| CN | 1232251 A | 10/1999 |
| CN | 1145951 C | 4/2004 |
| JP | A 2002-269911 | 9/2002 |
| JP | A-2003-091929 | 3/2003 |
| JP | A 2003-233957 | 8/2003 |
| JP | A-2003-308657 | 10/2003 |
| JP | A 2005-085294 | 3/2005 |
| JP | A-2005-317107 | 11/2005 |
| JP | A-2007-172808 | 7/2007 |
| WO | WO 03/085665 A1 | 10/2003 |

OTHER PUBLICATIONS

Chinese Office Action dated Sep. 2, 2010 in Chinese Patent Application No. 200610149776.5 (with translation).

\* cited by examiner

*Primary Examiner* — Wayne Young
*Assistant Examiner* — Dionne Pendleton
(74) *Attorney, Agent, or Firm* — Oliff & Berridge, PLC (57) ABSTRACT

A reading unit reads sound signals recorded in a recording medium. A buffer unit temporarily stores the sound signals which is read by the reading unit. A recording unit records the sound signal which is temporarily stored in the buffer unit. A reproducing unit reproduces the sound signals which is recorded in the recording unit. A controller controls reading speed of the reading unit. The sound signals include a first set of signals and a second set of signals. The reading unit reads the first set of signals at a first reading speed and reads the second set of signals at a second reading speed which is faster than the first reading speed after reading the first set of signals.

10 Claims, 8 Drawing Sheets

RECORDING AND REPRODUCING DEVICE, RECORDING AND REPRODUCING METHOD, AND VEHICLE-MOUNTED RECORDING AND REPRODUCING DEVICE

The disclosure of Japanese Patent Application No. 2006-019462 filed Jan. 27, 2006 including specification, drawings and claims is incorporated herein by reference in its entirety.

BACKGROUND OF THE INVENTION

The present invention relates to a recording and reproducing device, and a recording and reproducing method, and more particularly, to the recording and reproducing device and the recording and reproducing method for reading sound signals which have been recorded on a recording medium (a disk, for example), recording the signals which have been read on a recording unit (for example, hard disk drive, hereinafter referred to as an HDD), and at the same time, reproducing them.

Conventionally, there has been proposed a recording and reproducing device provided with an HDD having a large capacity as a recording unit, and adapted to reproduce sound signals which have been read by a CD deck or the like, and at the same time, to record those sound signals which have been read on the HDD (Reference should be made to Japanese Patent Publication No. 2002-269911A, for example). The recording and reproducing device of this type is so constructed that the sound signals recorded on a disk will be read at a high speed and recorded on the HDD, and the sound signals recorded on the HDD will be reproduced at an ordinary reproducing speed thereby to perform recording process and reproducing process of the sound signals at the same time.

FIG. 1 schematically shows relationship between the sound signals which will be read from the HDD to be reproduced, and the sound signals which will be recorded on the HDD, in the conventional recording and reproducing device. Referring to FIG. 1, time relation between the reproducing process (reading from the HDD) and the recording process (recording on the HDD) in the conventional device will be described. It is to be noted that in the following description, music and songs are objects to be processed, and that reproducing times are four minutes for a first song, six minutes for a second song, eight minutes for a third song, and eight minutes for a fourth song.

Figure 1A:
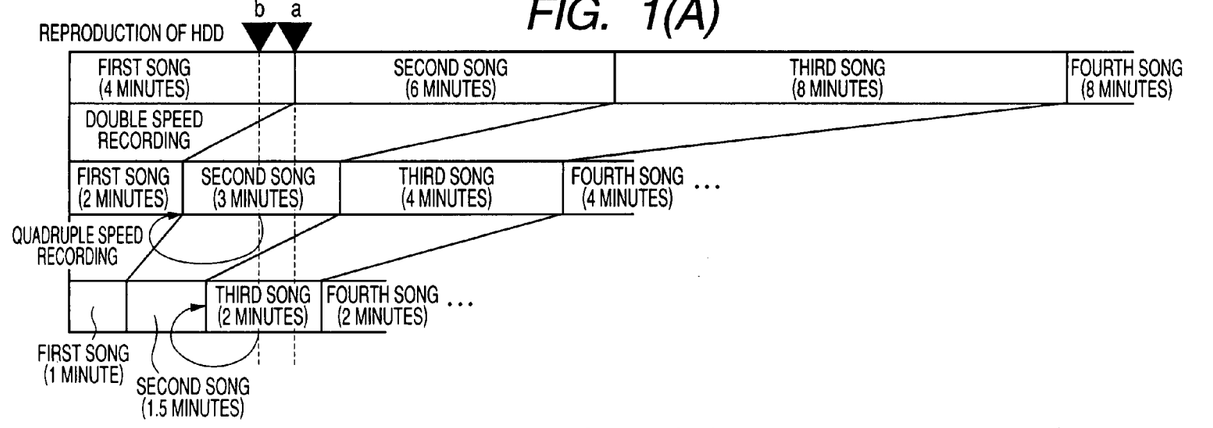
FIG. 1 is a schematic view schematically showing relationship between sound signals which will be read from the HDD to be reproduced, and sound signals which will be recorded on an HDD, in the conventional recording and reproducing device.

At the outset, in FIG. 1(A), attention should be paid to a time point a at which the reproduction of the sound signals of the first song recorded on the HDD has finished. In case where recording on the HDD is set at a double speed, recording of the first song has finished and the second song is on its way of recording at the time point a. In case where recording on the HDD is set at a quadruple speed, recording up to the second song has finished and the third song is on its way of recording at the time point a. In other words, in view of the time relation between the recording and the reproduction, the recording always precedes the reproduction, and the larger a degree of precedence is, the more merits can be obtained in the following respects.

Specifically, in order to temporarily store the sound signals which have been read from a CD reproducing section, a so-called retrying process that when an overflow has happened in a recording buffer which exists between the CD reproducing section and the HDD, the sound signals in the recording buffer will be destroyed, and the sound signals will be again read from a head of the recorded song to be stored in the recording buffer will be conducted. For example, in FIG. 1(A), in case where the retrying process has occurred at a time point b, the sound signals will be again read from a head of the second song in case of double speed recording, and from a head of the third song in case of quadruple speed recording, and will start to be stored in the recording buffer. The overflow represents a state that the sound signals which are excessively accumulated in the HDD as the recording unit exceed the storage capacity of the recording buffer in a case where the sound signal temporarily stored in the recording buffer can not be recorded on the HDD due to inaccessible state to the HDD by vibration or the like.

However, since the recording on the HDD precedes the reproduction, as described above, it is possible to prevent a dropout of sound in the song, even though an overflow has happened, by continuously reading the sound signals of the first song which has been recorded on the HDD.

Figure 1B:
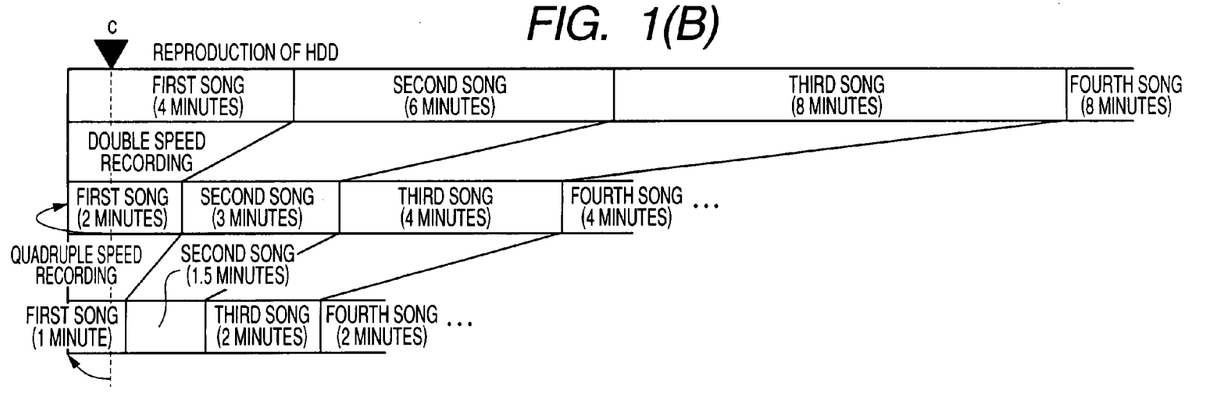

As described above, in case where the recording on the HDD sufficiently precedes the reproduction, an overflow in the recording buffer, that is, phenomenon of the retrying process can be overcome, at an enhanced degree. For this reason, it has been required for the CD reproducing section to read the sound signals at a higher speed, such as the quadruple speed, eightfold speed, sixteen-fold speed and so on. However, in the recording and reproducing device having the above described structure, when an overflow has happened in the recording buffer due to defective access to the HDD by vibration, at a time point c at which the same sound signals as those in the first song which is being reproduced have not yet recorded on the HDD, as shown in FIG. 1(B), the sound signals to be read from the HDD have not been completely recorded on the HDD. Therefore, it has been a problem that there is no sound signal to be read on halfway of the song, and a dropout of sound will happen, because the sound signals in the recording buffer have been destroyed at the retrying process. The same problem may occur in a case where the recording unit except for the HDD is used in the recording and reproducing device.

SUMMARY OF THE INVENTION

It is therefore an object of the invention to provide a recording and reproducing device in which an overflow is unlikely to happen in a state where recording on a recording unit of the same sound signals as the sound signals which is now being reproduced has not yet finished, whereby a dropout of sound will hardly occur.

It is prevented that an overflow of the recording buffer, that is, retrying process occurs, until an amount of recording on the HDD exceeds a determined amount, for example, until one song has been completely recorded.

In order to achieve the above-mentioned object, according to the invention, there is provided a recording and reproducing device comprising:

a reading unit that reads sound signals recorded in a recording medium;

a buffer unit that temporarily stores the sound signals which is read by the reading unit;

a recording unit that records the sound signal which is temporarily stored in the buffer unit;

a reproducing unit that reproduces the sound signals which is recorded in the recording unit; and a controller that controls reading speed of the reading unit, wherein:

the sound signals include a first set of signals and a second set of signals; and the reading unit reads the first set of signals at a first reading speed and reads the second set of signals at a second reading speed which is faster than the first reading speed after reading the first set of signals.

With this configuration, it is possible to make an overflow of the recording buffer which happens at a time of defective access to the recording unit unlikely to happen.

The reading unit initially may read the first set of signals from among the sound signals recorded in the recording medium.

The recording and reproducing device may further comprise a compressing unit that compresses the sound signals which is recorded in the recording unit when the reading unit reads the sound signal at the second reading speed.

With this configuration, because the compressing process (encoding process) is not conducted on occasion of reading at the first speed, the sound signals which have been recorded on the disk, the number of accesses to the recording unit can be decreased, and influences by vibration can be minimized.

The recording unit may include a hard disk drive. With this configuration, it is possible to make an overflow of the recording buffer which happens at a time of defective access to the HDD unlikely to happen.

According to the invention, there is also provided recording and reproducing device, comprising:

a reading unit that reads sound signals recorded in a recording medium at a first reading speed;

a buffer unit that temporarily stores the sound signals which is read by the reading unit;

a recording unit that records the sound signal which is temporarily stored in the buffer unit;

a reproducing unit that reproduces the sound signals which is recorded in the recording unit; and a controller that controls reading speed of the reading unit, wherein in a case where the sound signals overflow in the buffer unit while the reading unit reads the sound signals at a first reading speed, the reading unit again reads the sound signals from the beginning at a second reading speed which is lower than the first reading speed.

With this configuration, it is possible to make repeated overflows in the recording buffer unlikely to happen, in case where the retrying process due to defective access to the recording unit has occurred.

The recording and reproducing device may further comprise a compressing unit that compresses the sound signals which is recorded in the recording unit when the reading unit reads the sound signal at the first reading speed.

According to the invention, there is also provided a recording and reproducing device comprising:

a reading unit that reads sound signals recorded in a recording medium;

a buffer unit that temporarily stores the sound signals which is read by the reading unit;

a recording unit that records the sound signal which is temporarily stored in the buffer unit;

a reproducing unit that reproduces the sound signals which is recorded in the recording unit; and a controller that controls reading speed of the reading unit, wherein:

the sound signals include a first set of signals and a second set of signals which is differ from the first set of signals;

the reading unit reads the sound signals at a first reading speed in a case where the reproducing unit reproduces the first set of signals while the buffer unit stores the first set of signals; and the reading unit reads the sound signals at a second reading speed which is faster than the first reading speed in a case where the reproducing unit reproduces the first set of signals while the buffer unit stores the second set of signals.

According to the invention, there is also provided a recording and reproducing method comprising:

providing a recording medium recording sound signals which include a first set of signals and a second set of signals;

reading the first set of signals at a first reading speed; then reading the second set of signals at a second reading speed which is faster than the first reading speed;

temporarily storing the sound signals after the reading;

recording the sound signals after the storing; and reproducing the sound signals after the recording, wherein:

the sound signals include a first set of signals and a second set of signals; and the first set of signals is read at a first reading speed and the second set of signals is read at a second reading speed which is faster than the first reading speed after the first set of signals is read.

According to the invention, it is possible to create such environment that an overflow of the recording buffer is unlikely to happen, on occasion of reading a set of the sound signals in the head part of the disk just after the start of the recording. Moreover, it is possible to create such environment that an overflow of the recording buffer is unlikely to happen, while the sound signals in the same group are read again, during high speed recording.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Now, referring to the drawings, an embodiment of the invention will be described. It is to be noted that the following description relates to a case in which the invention is applied to a complex apparatus including the recording and reproducing device combined with another device having other functions. Therefore, an entire structure of the complex apparatus will be described first, and thereafter, those parts relevant to the recording and reproducing device will be described.

Figure 2:
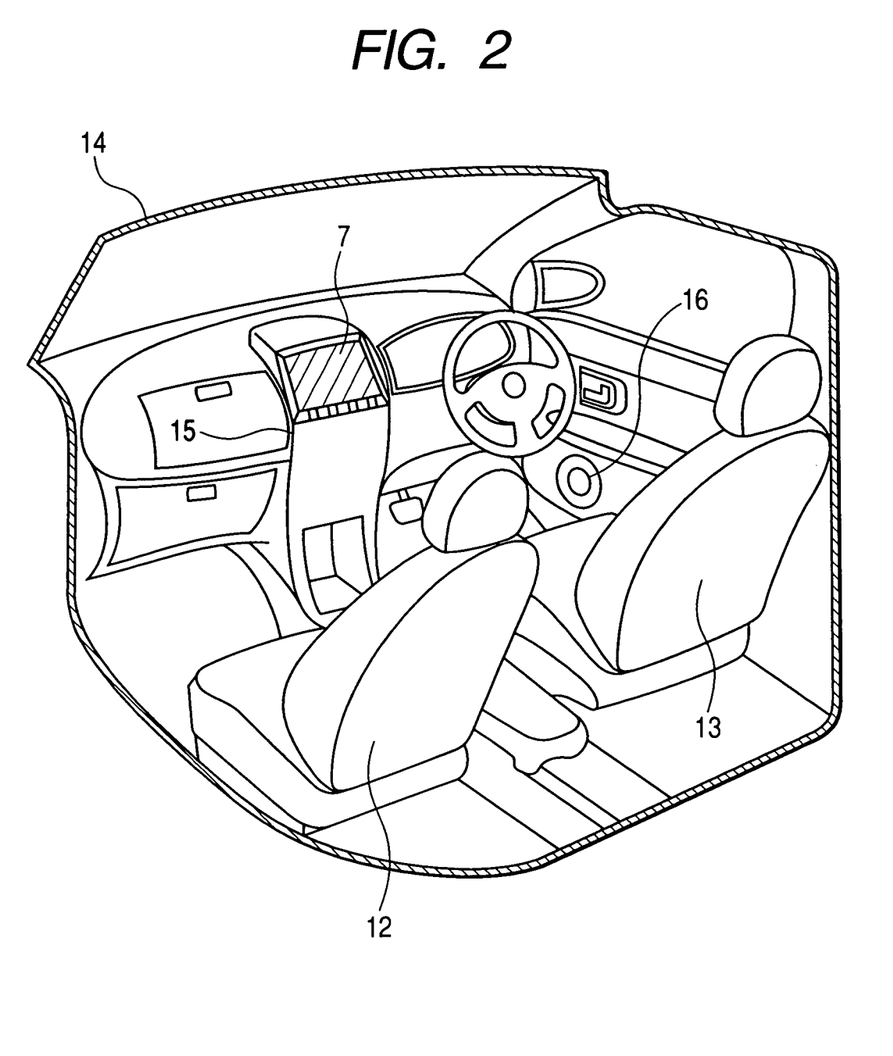
FIG. 2 is a perspective view showing an example of a complex apparatus mounted on a vehicle.

FIG. 2 is a perspective view showing the complex apparatus (hereinafter referred to as an AVN (Audio Visual Navigation) apparatus) which has a navigation function, a sound reproducing function for reproducing sound signals and radio broadcast which have been recorded on a recording medium such as a CD (Compact Disc), an HDD, and an image reproducing function for reproducing image signals and television broadcast which have been recorded on a recording medium such as a DVD (Digital Versatile Disk), HDD, in a state mounted on a vehicle.

In FIG. 2, numeral 12 is an assistant driver's seat, 13 is a driver's seat, 14 is a front window glass, 15 is an operating part, and 16 is a speaker. A display part 7 of the AVN apparatus is formed of a liquid crystal display element, and arranged, in many cases, substantially at the center between the driver's seat 13 and the assistant driver's seat 12. Various operations of the AVN apparatus will be conducted by a touch panel including transparent film switches and arranged on a surface of the display part 7, the operating part 15, and a remote controller of infrared type or wireless type. The speakers 16 are respectively arranged in doors of the vehicle to output sounds or warning sounds associated with a displayed image.

Figure 3:
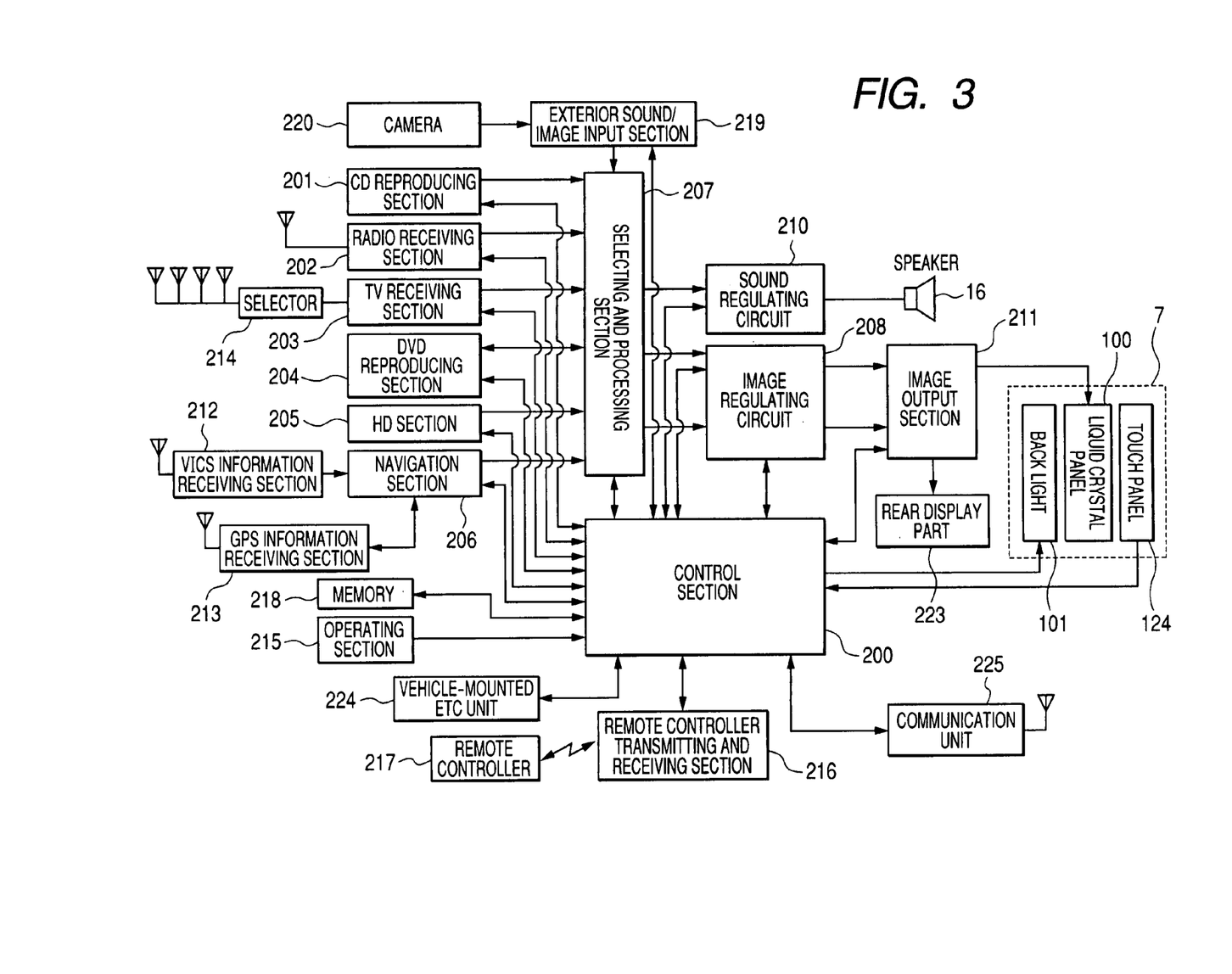
FIG. 3 is a block diagram showing structure of the complex apparatus.

FIG. 3 is a block diagram schematically showing a general outline of the AVN apparatus. In FIG. 3, numeral 124 is the touch panel, 200 is a control section, 201 is a CD reproducing section, 202 is a radio receiving section, 203 is a TV receiving section, 204 is a DVD reproducing section, 205 is an HD reproducing section, 206 is a navigation section, 207 is a selecting and processing section, 208 is an image regulating circuit, 210 is a sound regulating circuit, 211 is an image output section, 212 is a VICS information receiving section, 213 is a GPS information receiving section, 214 is a selector, 215 is an operating section, 216 is a remote controller transmitting and receiving section, 217 is a remote controller, 218 is a memory, 219 is an exterior sound and image input section, 220 is a camera, 223 is a rear display part, 224 is a vehicle-mounted ETC unit, and 225 is a communication unit.

The display part 7 will display a TV image or a route guide chart, and includes a liquid crystal panel 100 and a back light 101. Moreover, the touch panel 124 including the transparent film switches is provided on a surface of the liquid crystal panel 100, thereby to impart touch operating function to the display part 7. Besides the liquid crystal panel, a flat panel display, such as an organic EL display panel, a plasma display panel, a cold cathode flat panel display can be employed as the display part 7. Moreover, it is also possible to employ a cathode ray tube (Braun tube), unless there is a dimensional problem in thickness.

The CD reproducing section 201 will read the sound signals recorded on the CD, and output them to the selecting and processing section 207. The radio receiving section 202 will receive radio broadcast waves and output them to the selecting and processing section 207. The TV receiving section 203 will receive television broadcast waves and output them to the selecting and processing section 207. The TV receiving section 203 employs diversity receiving system in which a plurality of antennas are connected through the selector 214 which will selectively connect the antennas in good receiving condition. The DVD reproducing section 204 will read the signals recorded on the DVD, and output them to the selecting and processing section 207. The HD section 205 is the HDD that reads the signals recorded on a magnetic disk to output them to the selecting and processing section 207, and at the same time, will record the signals inputted from the selecting and processing section 207 on the magnetic disk. The HD section 205 is also used for storing road data in order to search routes and to display maps and landscapes to be used in the navigation section 206, sound data of music, and music information data such as titles of songs, and for temporarily recording the data for data processing. The camera 220 will take pictures of a rear part of the vehicle, and output them to the selecting and processing section 207.

The navigation section 206 will search routes to the destination which has been set by a user, and display guide images on the display part 7. Specifically, the navigation section 206 will input the signals from the GPS information receiving section 213, a vehicle speed sensor, and a gyroscope, thereby to detect a position of the vehicle itself, and will input traffic information from the VISC information receiving section 212, thereby to conduct, by using this information, search of the routes, guide of the routes, and announcement of the traffic information.

The GPS information receiving section 213 will receive GPS signals from GPS satellites, and calculate the position of the vehicle itself, based on the GPS signals. As the vehicle speed sensor, a speed meter and a vehicle speed sensor used for controlling an engine may be commonly used, and the vehicle speed will be outputted. The gyroscope includes a semiconductor acceleration detecting device in two or three dimensions, and will detect angular velocity of the vehicle. Then, the angular velocity will be integrated, and the integrated value will be added to a standard direction of the vehicle at a starting time point of the integration thereby to obtain the direction of the vehicle.

The standard direction of the vehicle will be determined by such a method that at a time point when the direction of the vehicle can be determined, that is, the time point where a linear running has continued over a determined distance, for example, the direction of the running way can be determined, referring to information of its own vehicle position (obtained from information of the position which has been calculated from the GPS information by that time point) and map information. Then, the velocity will be calculated from the vehicle direction and the vehicle speed (direction of travel and speed) which have been obtained, and the velocity will be integrated and added to the standard position, whereby the position of the vehicle will be calculated. Then, the position of the vehicle itself calculated by the vehicle speed sensor and the gyroscope will be employed as the standard, and the position will be complimented by the position of the vehicle which has been calculated by the GPS information receiving section 213. For example, process for correcting the position of the vehicle by the position of the vehicle which has been calculated by the GPS information receiving section 213 will be conducted at an every determined time. Moreover, process for correcting the calculated position of the vehicle itself referring to the road data will be conducted. For example, in case where the vehicle is at a position where no road exists according to the road data, process for correcting the position of the vehicle itself to a position on a nearby road will be conducted.

The VICS information receiving section 212 will receive traffic information which has been sent from optical beacons and radio beacons arranged along the road, and traffic information superposed on FM radio waves, to output them to the navigation section 206. The navigation section 206 will display the traffic information on the display part 7, and will search the routes taking the traffic information into account, using information of traffic jam and traffic restrictions in the traffic information.

The vehicle-mounted ETC (Electronic Toll Collection) unit 224 will communicate with a center device of the ETC center by way of road-installed units which are installed on gates or the like of toll roads, thereby to settle turnpike tolls and so on. The communication unit 225 is connected to a radio communication network in order to get access to an internet and to exchange electronic mails, and includes a radio (mobile) telephone, a device on a wireless LAN, etc.

The remote controller transmitting and receiving section 216 is connected to the remote controller 217 by infrared rays or radio waves so as to communicate two-directionally. Specifically, the remote controller transmitting and receiving section 216 will receive operation command signals from the remote controller 217 according to operation of a remote controller operator, and also transmit information of announcement to be displayed on the remote controller 217, and control signals for controlling operation mode of the remote controller 217. The operating section 215 will conduct various operations of the AVN apparatus, and includes push button switches which are arranged around the display part 7. The touch panel 124 also belongs to the operating section 215. In the touch panel 124, contents of the operation will be determined in association with contents of the display on the display part 7, to conduct corresponding operation of the AVN apparatus.

The memory 218 is a semiconductor storage unit for temporarily storing programs and data for realizing various operations, and data in a progress of conducting various processes. The memory 218 includes a ROM (Read Only Memory) and a RAM (Random Access Memory), and may be provided with an EEPROM (Electronically Erasable and Programmable Read Only Memory) which can be electrically rewritten according to necessity, or the RAM which has such a power supply backup function that power supply for keeping the stored contents can be maintained, even in an off state of a power supply switch.

The selecting and processing section 207 will selectively input signals from a reproducing signal source such as the CD reproducing section 201, the radio receiving section 202, and according to necessity, process these signals, and selectively output them. The selecting and processing section 207 includes a change-over switch circuit, a digital signal processing circuit including a DSP (Digital Signal Processor) or the like, and a memory. The sound regulating circuit 210 will process sound signals thereby to regulate levels of the sounds to be outputted, frequency performance, and sound field performance (performances of reflected sounds and reverberation by delaying process or the like), and includes the digital signal processing circuit including a DSP or the like. The sound signals which have been processed in this sound regulating circuit 210 will be amplified by an amplifier (not shown), and outputted from the speaker 16 as the sounds.

The image regulating circuit 208 will process image signals thereby to regulate tone of color, brightness and contrast of the displayed images, and to perform superimposing treatment for superimposing divided pictures, enlarged or reduced pictures, characters and so on. The image regulating circuit 208 includes an image memory for storing image data of the object to be processed, a digital image processing circuit including the DSP or the like for performing digital computation on the image data which have been stored in the image memory, a VRAM (a video RAM) on which the inputted image is recorded, and so on. The image outputting section 211 will actuate the liquid crystal panel 100 based on the data stored in the VRAM in the image regulating circuit 208 thereby to display a desired image on the display part 7. The image outputting section 211 includes a converting circuit for converting the data stored in the VRAM into an image signal for actuating the liquid crystal panel 100, an amplifying circuit, a synchronization signal producing circuit, etc.

The control section 200 will control various operations of the respective constituent elements in the CD reproducing section, such as start of the reproduction, stop of the reproduction, selection of the songs, and signal processing operations in the image regulating circuit 208 and the sound regulating section 210, based on the signals from the various input sections such as the operating section 215, thereby to control all operations of the AVN apparatus. The control section 200 includes a microcomputer.

Figure 4:
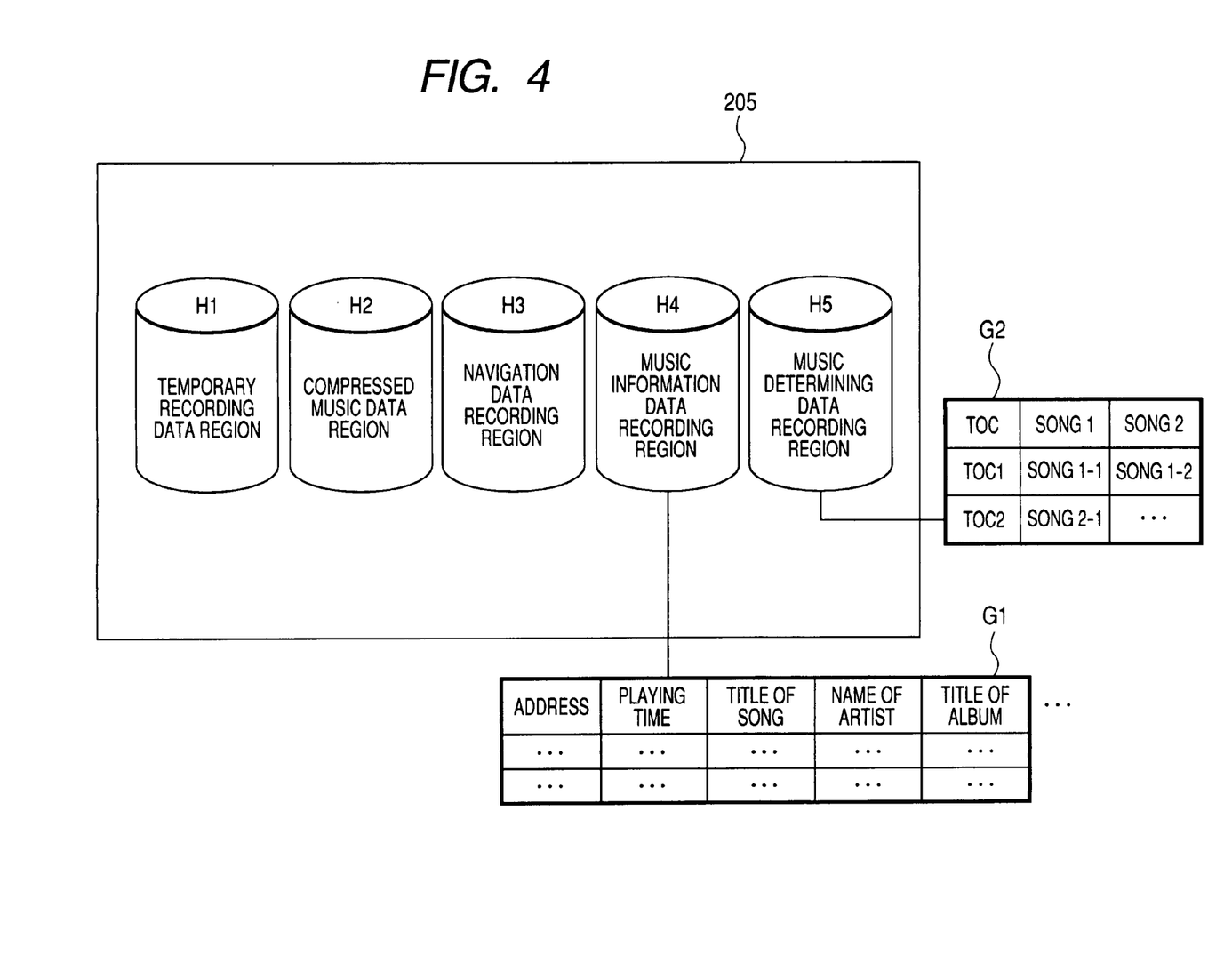
FIG. 4 is a schematic view showing general outline of contents to be recorded by recording unit.

Then, the data which have been recorded in the HD section 205 will be described. FIG. 4 is a schematic view showing an outline of the contents recorded in the HD section 205. The HD section 205 includes a temporary recording data region H1 for temporarily recording sound data such as the sound signals of the music to be processed, a compressed music data region H2 in which the sound data of the music which have been compressed (hereinafter referred to as the compressed music data) are recorded, a navigation data recording region H3 in which data such as the road data and data of facilities for setting the destination to be used in the navigation section 206 are stored, a music information data recording region H4 in which the music information such as titles and artists of the songs are stored, and a music determining data recording region H5 in which data for determining the songs which have been reproduced by the CD or DVD are recorded. In these data recording regions, the corresponding data are respectively stored. It is to be noted that these regions are only schematically shown for easy understanding of the description. Although regions of the magnetic disk in the HD section 205 may be set in advance, as shown in FIG. 4, there is no necessity of setting the regions for recording in advance, provided that the data can be selectively read, for example, by giving codes to the respective data for identification.

The compressed music data region H2 stores the compressed music data together with information of the compression such as a method of compression (AAC, ATRAC3+, WMA, MP3, etc.). The music information data recording region H4 stores music information G1 for reproducing the music and searching the song. The music information G1 includes, for example, an address showing a position where the song is stored in the HD section 205, playing time of the song, title of the song, name of the artist, title of the album (title of the recorded CD), etc. The music determining data recording region H5 stores music determining data G2 which include the music information relative to the CD (and DVD) and the number of the song. Specifically, the music information is stored in correspondence with TOC (Table Of Contents) information of the CD and the number of the song (reproducing order of the CD). The music determining data may be stored in such a manner that basic data are stored when the AVN apparatus is produced, and as for the music determining data which have not yet been stored, such as a CD which will be released afterward, a method of taking data superposed on the FM broadcast, for example, or a method of taking the data by way of the internet is considered.

In the AVN apparatus having the above described structure, the recording and reproducing device in this embodiment is realized by including, for example, the control section 200, the CD reproducing section 201, the DVD reproducing section 204, the HD section 205, the selecting and processing section 207, and the sound regulating circuit 210.

Figure 5:
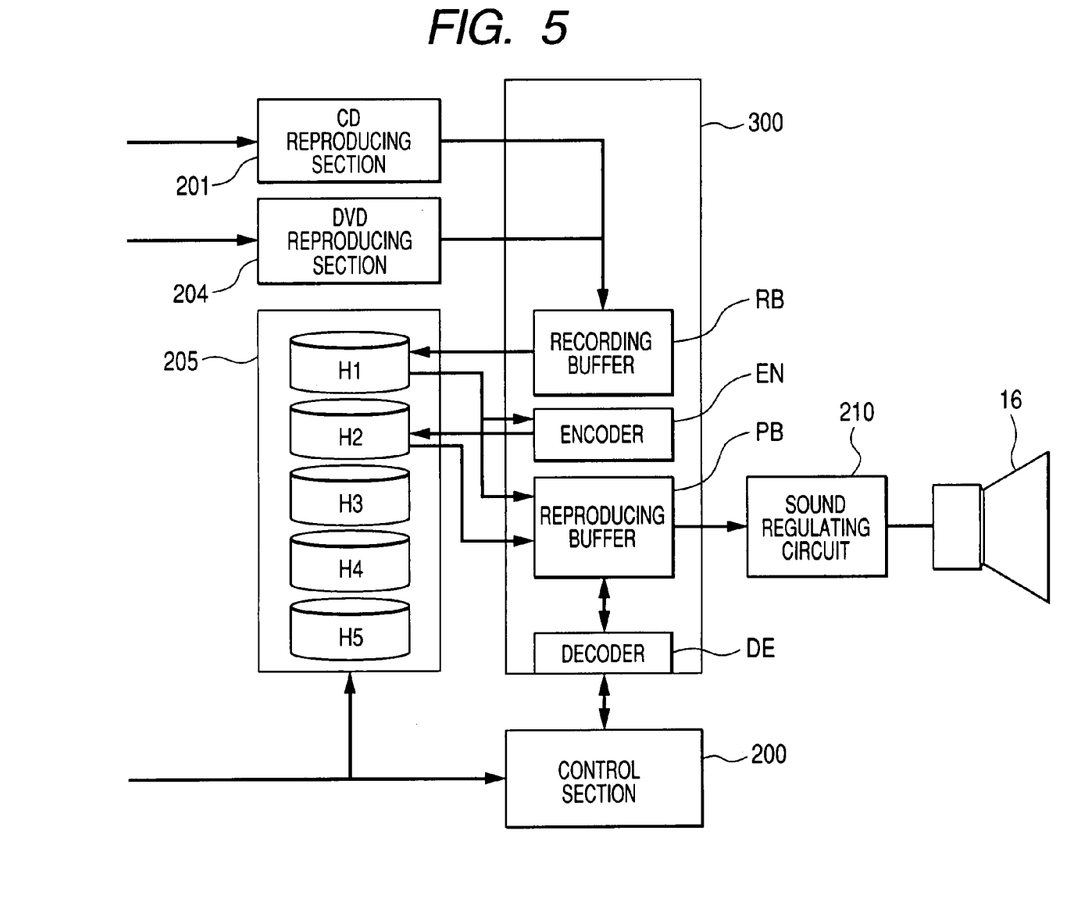
FIG. 5 is a block diagram showing structure of a music reproducing section.

Now, reproduction of the CD which has been played in the CD reproducing section 201, and reproduction of the music which has been recorded in the HD section 205 in the recording and reproducing device having the above described structure will be described, together with the recording and compressing processes. FIG. 5 is a structural view showing structure of a music reproducing section 300 in the selecting and processing section 207 which performs reproduction of the sounds on the CD (or DVD) which have been played in the CD reproducing section 201, and reproduction of sounds of the music which have been recorded in the HD section 205.

A recording buffer RB is a buffer memory including a RAM which temporarily stores the sound data from the CD reproducing section 201 (or the DVD reproducing section 204). An example of the buffer memory will be described. It is to be noted that other method of forming the buffer memory can be also applied. For example, the buffer memory may include a ring buffer, and the data inputted from the CD reproducing section 201 will be written sequentially and circularly by control of a DMAC (Direct Memory Access Controller). The data written on the ring buffer will be read by the control section 200 (a memory controller controlled by the control section 200), and written in the HD section 205 by control of a hard disk controller (controlled by the control section 200) for example.

An encoder EN will perform compression process on the sound data which have been stored in the temporary recording data region H1 in the HD section 205, and includes an LSI (Large Scale Integration) which has realized compressing function by a hard structure (such as a logic circuit). It is also possible to perform the compression process by software process using a CPU (Central Processing Unit). A reproducing buffer PB is a buffer memory including a RAM which temporarily holds the sound data to be reproduced.

In this embodiment, the reproducing buffer PB has a larger capacity than the recording buffer RB. A decoder DE will process the sound data which have been temporarily stored in the reproducing buffer PB, in an extension system corresponding to a compression system which has been applied to the sound data (the music sound data in an uncompressed state will not be processed), to convert the data into the sound data in an uncompressed state. The decoder DE includes an LSI which has realized the extending function by a hard structure (such as a logic circuit). It is also possible to perform the extension process by soft process using the CPU.

Now, reproducing and recording operations of the CD in the music reproducing section 300 will be described. When the reproduction of the CD has started, the sound signals from the CD reproducing section 201 will be recorded in the recording buffer RB, and their TOC information will be inputted into the control section 200. Then, the sound signals recorded in the recording buffer RB will be written into the temporary recording data region H1 in the HD section 205, at a timing suitable for recording in the HD section 205 (such as a timing when an amount of the data stored in the recording buffer RB has exceeded a determined amount), in a unit of a determined amount of the data. The sound data which have been stored in the temporary recording data region H1 will be compressed by the encoder EN, and stored in the compressed music data region H2.

The sound data which have been stored in the temporary recording data region H1 will be sequentially written into the reproducing buffer PB for reproducing the sounds. The music data written into the reproducing buffer PB will be inputted according to the timing for reproducing the music, subjected to regulation of sound volume, regulation of sound tone, control of sound field, and digital-analogue conversion in the sound regulating circuit 210, and thereafter, amplified to be reproduced from the speaker 16. The CD reproducing section 201 is so constructed that the sound signal stored on the disk can be read at a double speed or quadruple speed, and reading speed (the double speed or the quadruple speed) can be changed according to a command from the control section 200.

The above described example is for a case of ordinary reproduction of the CD (the uncompressed music data). In case of reproducing a CD-ROM in which the compressed music data have been written, by the CD reproducing section 201, the data to be stored in the recording buffer RB are the compressed music data which have been stored in the CD-ROM, and will be stored in the temporary recording data region H1 still in the compressed state, and further, stored in the compressed music data region H2. In order to store the music data in the compressed music data region H2, it is also possible to store the music data by converting them into a determined compressed state (the compressed state to be stored in the compressed music date region H2 must be unified) by the encoder EN. Moreover, the music data can be stored also in the reproducing buffer PB still in the compressed state from the temporary recording data region H1, outputted according to the timing for reproducing the music, after the extension process has been performed by the decoder DE, then, subjected to regulation of sound volume, regulation of sound tone, control of sound field, and digital-analogue conversion in the sound regulating circuit 210, and thereafter, amplified to be reproduced from the speaker 16 as the sounds.

Further, the music information data which have been stored in the CD-ROM together with the compressed music data will be inputted into the control section 200, and the control section 200 will store the music information in the music information data region H4, in association with the compressed music sound data which have been stored in the compressed music data region H2. The control section 200 will read the music information of the song which is now being reproduced, from the music information data region H4, in the same manner as the ordinary reproduction of the CD (the uncompressed music data), and will display the music information on the display part 7, according to operation for displaying the music information by the user.

Then, reproducing operation of the HD section 205 in the music reproducing section 300 will be described. When the user has made a commanding operation to reproduce the music which has been stored in the HD section 205 (the compressed music data region H2), the control section 200 will allow the reproducing buffer PB to store the relevant compressed music sound data selected from the compressed music data region H2, still in the compressed state. The compressed music sound data which have been stored in the reproducing buffer PB will be outputted according to the timing for reproducing the music, after the extension process has been performed by the decoder DE, then, subjected to regulation of sound volume, regulation of sound tone, control of sound field, and digital-analogue conversion in the sound regulating circuit 210, and thereafter, electrically amplified to be reproduced from the speaker 16 as the sounds. The control section 200 will read the music information of the song which is now being reproduced, from the music information data region H4, and will display the music information on the display part 7, according to operation for displaying the music information by the user.

Figure 6A:
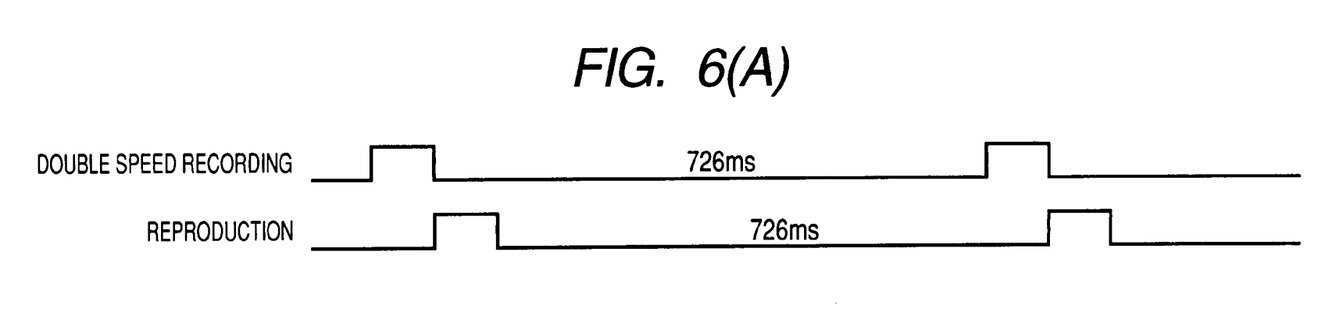
FIG. 6 is a view showing timings of recording and reproducing process.

Now, referring to FIG. 6, the timings for the operations of the music reproducing section 300 will be described. FIG. 6(A) shows a timing for recording the sound signals in the HD section 205 at double speed recording, and a timing for reproducing the sound signals from the HD section 205. As shown in FIG. 6(A), both the double speed recording and the reproduction are conducted sequentially at an interval of 726 ms. Because the double speed recording is slower in reading the sound signals from the disk, as compared with the below described quadruple speed recording, the speed in which the sound signals which have been read are stocked in the recording buffer RB will be a half of the quadruple speed recording.

Accordingly, possibility of an overflow in the recording buffer RB will be decreased, in case where an inaccessible state to the HD section 205 due to occurrence of vibration has happened.

Moreover, as shown in FIG. 6, because the compression process will not be conducted in case of the double speed recording (recording at a low speed), accesses to the HD section 205 will be less frequently conducted, as compared with the case of the quadruple speed recording, which will be described below. Accordingly, possibility of being influenced by the vibration of the HD section 205 will be decreased. In other words, by restricting the number of the accesses to the HD section 205, probability of the inaccessible state to the HD section 205 due to occurrence of vibration will be decreased, and thus, durability of the device against vibration will be enhanced.

Figure 6B:
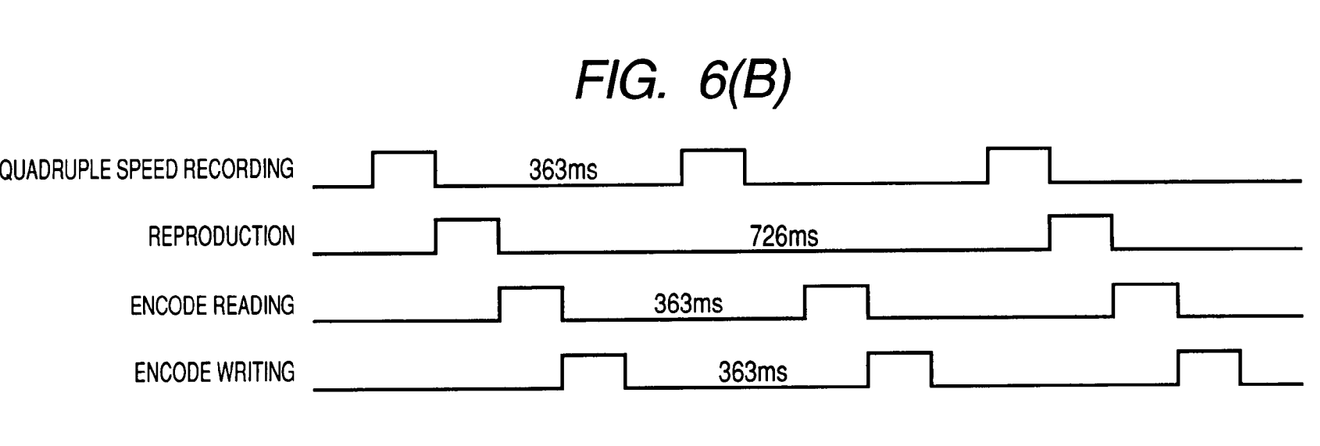

FIG. 6(B) shows a timing for recording the sound signals in the HD section 205 at the quadruple speed recording, and a timing for reproducing the sound signals from the HD section 205. As shown in FIG. 6(B), all the processes of the quadruple speed recording, encode reading of the sound signals to be compressed, and encode writing are conducted sequentially at an interval of 326 ms. Only the reproducing process is conducted at an interval of 726 ms.

Specifically, although the quadruple speed recording can record the sound signals in the HD section 205 at a higher speed than the double speed recording, the sound signals will be read from the disk at the higher speed, and therefore, the speed in which the sound signals which have been read will be stocked in the recording buffer RB becomes a double. Accordingly, in case where an inaccessible state to the HD section 205 due to occurrence of vibration has happened, possibility of an overflow in the recording buffer RB will be increased, as compared with the double speed recording.

Moreover, in this embodiment, the compression process will be conducted in case of the quadruple speed recording. Therefore, frequency of the accesses to the HD section 205 will be increased at the quadruple speed recording, and, the possibility of being influenced by the vibration of the HD section 205 will be increased. Accordingly, the probability of the inaccessible state to the HD section 205 due to occurrence of vibration will be increased, as compared with the double speed recording, and thus, the durability against vibration will be deteriorated.

However, because it is possible by the quadruple speed recording to record the sound signals in the HD section 205 at the higher speed as compared with the double speed recording, the time required for recording will be reduced. Therefore, the quadruple recording has such a merit that strength for coping with retrying process will be increased, because the recording can be performed in a short time.

Figure 7:
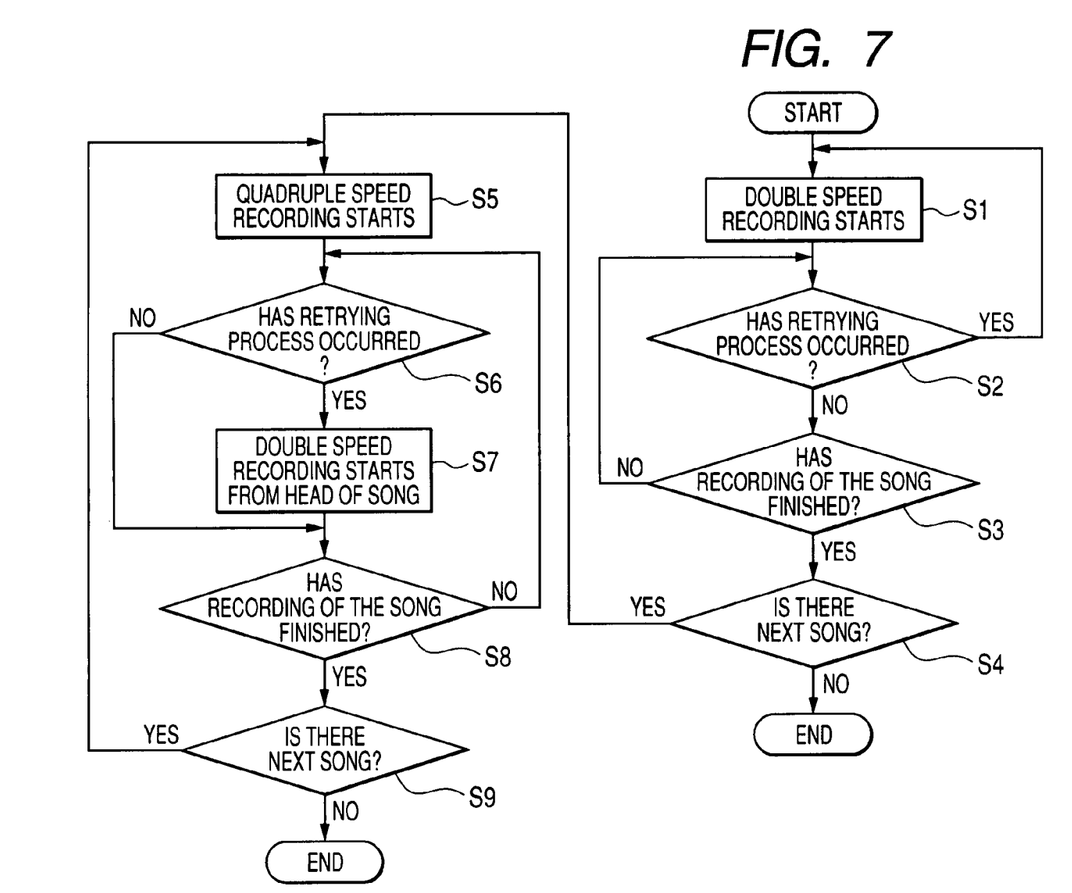
FIG. 7 is a flow chart showing contents of controls of a control section.

Now, an example of contents of the controls by the control section 200 will be described, referring to a flow chart in FIG. 7. The controlling process according to this flow chart will be started, for example, by an insertion of the disk as a trigger. As shown in FIG. 7, in a step S1, recording of the sound signals of a first song on the disk into the HD section 205 will be started at the double speed.

In a step S2, whether the retrying process due to a buffer overflow in the recording buffer RB has occurred or not will be judged. This retrying process will be conducted, when the control section 200 has detected generation of the overflow in the recording buffer RB. In case where the occurrence of the retrying process has been detected in this step S2, the flow will be returned to the step S1, and the recording at the double speed will be started again from a head of the first song. In a step S3, whether recording of the sound signals now on recording has finished or not will be judged. This judgment will be conducted, for example, when the control section 200 (the microcomputer) has detected an end signal contained in the sound signals. Then, while the retrying process is monitored until the recording of the sound signals has finished (the step S2), the recording at the double speed will be continued.

When it has been judged in the step S3 that the recording of the song has finished, the flow will proceed to a step S4, and whether or not there are the sound signals to be recorded next will be judged. If there is no sound signal, the recording process will be finished. In case where there are the sound signals to be continuously recorded, the flow will proceed to a step S5, and recording of the sound signals will be started by converting the recording speed from the double speed to the quadruple speed. This conversion to the quadruple speed will be conducted according to a command from the control section 200 to the CD reproducing section 201.

In a step S6, whether or not the retrying process has occurred, while the recording at the quadruple speed is going on, will be monitored. In case where the retrying process has not occurred, the recording will be continued until the recording of the song is completed (a step S8). In case where occurrence of the retrying process during the quadruple recording has been detected in the step S6, the recording at the double speed will be started again from the head of the song to be retried (a step S7), by converting the recording speed from the quadruple speed to the double speed (the lower speed). Then, while whether or not the retrying process has occurred is monitored, the recording at the double speed will be continued until the recording of the song is completed. In case where the retrying process has occurred again during the recording at the double speed, the double speed recording will be started again from the head of the song.

When it has been judged in the step S8 that the recording of the song has finished, whether or not there are the sound signals to be recorded next will be judged in a step S9. In case where there are the sound signals to be continuously recorded, the recording will be started by converting the recording speed to the quadruple speed. In case where there is no sound signal to be recorded next, the recording process will be finished.

Although the contents of the controls of the control section 200 in this embodiment have been heretofore described, a specific example of actually recording music according to the controls will be described referring to FIG. 8. In the following description, it is considered that the CD contains a plurality of songs, and each song includes a group of sound signals containing a plurality of sound signals. Therefore, the headmost song of the disk unit the set of the sound signals which has been recorded in a head part of the disk. Although the set of the sound signals which has been recorded in the head part of the disk is described as forming a single song as a unit, it is not absolutely necessary to form a single song by the set of the sound signals as a unit. It is of course possible to consider a plurality of songs as the set of the sound signals which has been recorded in the head part of the disk, taking reproducing time, recording speed, capacity of the recording buffer into account.

Moreover, the headmost song of the disk unit the song which will be first read, after insertion of the disk has been detected, and does not necessarily mean the song which has been recorded in the head part of the disk. For example, in case where reading of the disk starts from a fifth song, "the set of the sound signals which has been recorded in the head part of the disk" unit the set of the sound signals which has been recorded in a fifth part of the disk.

Figure 8:
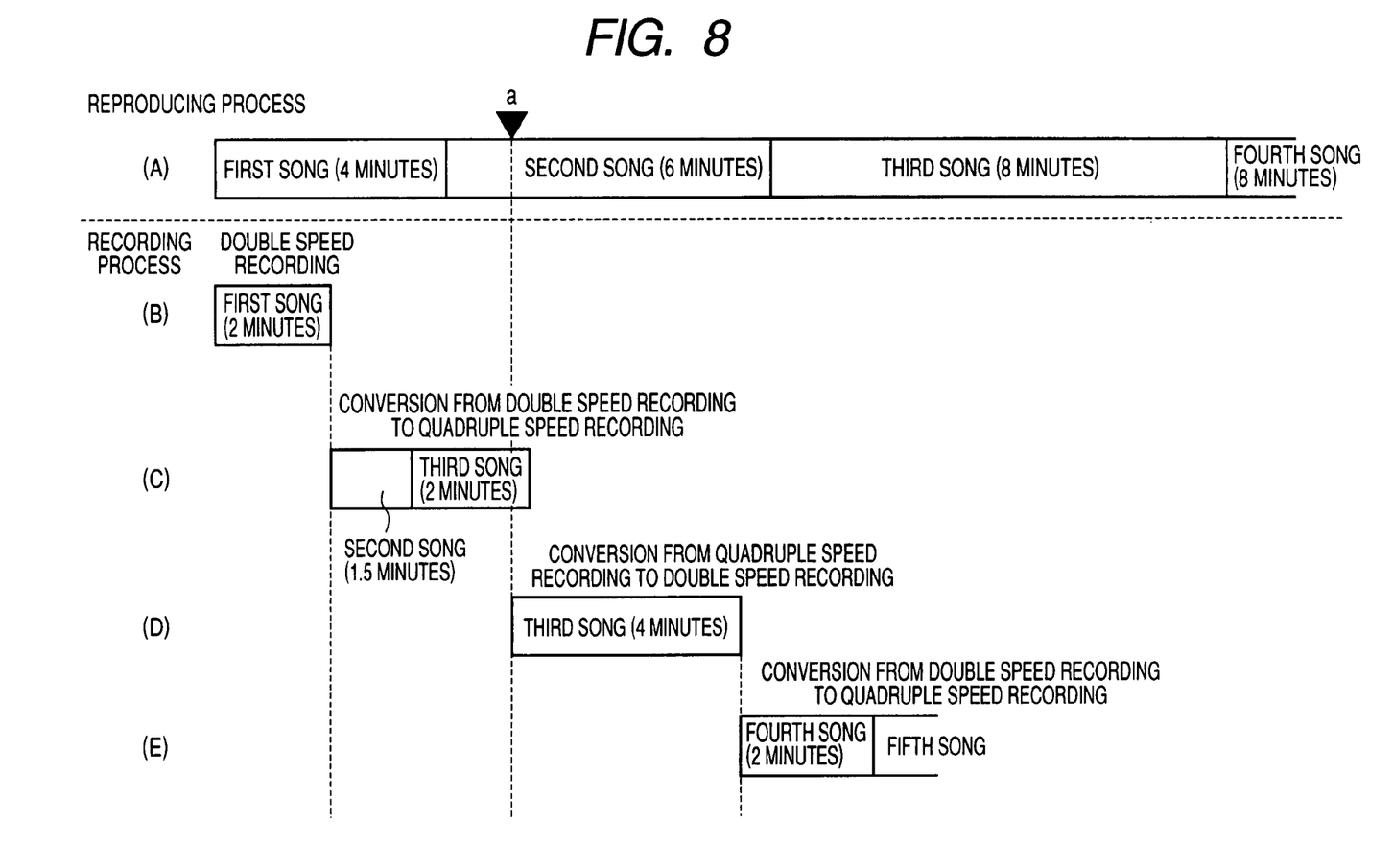
FIG. 8 is a schematic view showing an example in which the processes have been conducted according to the contents of the controls of the control section.

As shown in FIG. 8, by varying the recording speed (the double speed, quadruple speed) depending on the object to be recorded (the song) and recording situation (whether or not the retrying process has occurred), these controls will try to make the most of the performances of the double speed recording and the quadruple speed recording as described above.

FIG. 8(A) shows a flow of time for reproducing the sound signals recorded on the disk, and a state where the songs are sequentially reproduced from the first song (reproducing time is four minutes) is shown. FIGS. 8(B) to (E) show the recording processes of the sound signals recorded on the disk.

When the disk has been inserted into a deck, recording of the first song (the headmost song) will be started at the double speed, as shown in FIG. 8(B), and substantially at the same time with this recording process, reproducing process will be conducted. The reason why the recording process is first conducted at the double speed is because an overflow in the recording buffer RB will hardly happen at the double speed recording, as described above. In case where the retrying process due to the buffer overflow in the recording buffer RB occurs in a state where the recording of the first song has not yet finished, a dropout of sound will inevitably happen. The double speed recording will avoid such phenomenon.

Moreover, because the encoding process is not conducted during the double speed recording, resistance to vibration of the HD section 205 itself will be enhanced, and it is possible to realize such environment that excessive stock of the sound signals in the recording buffer RB due to inaccessible state to the HDD by vibration is unlikely to occur.

After the double speed recording of the first song has finished, the recording speed to the HD section 205 will be converted from the double speed to the quadruple speed. As described above, this conversion of the recording speed will be conducted by a command for converting the recording speed which is issued from the control section 200 to the CD reproducing section 201, when an end signal contained in the sound signals of the first song has been detected. FIG. 8(C) shows that recording of the second and third songs are conducted in a state where the recording speed has been converted from the double speed to the quadruple speed. In this manner, by converting the recording speed for the second song and further songs to the quadruple speed, it is possible to reduce the time required for the recording process. At the same time, by conducting the encoding process, it is possible to compress the sound signals which have been already recorded in the HD section 205, while the song is being reproduced.

Now, a case where an overflow in the recording buffer RB due to inaccessible state to the HDD by vibration has happened at a time point a, during the quadruple speed recording of the third song will be described. In this case, as shown in FIG. 8(C), because the recording of the third song has not yet finished, the retrying process will occur, and the recording will be started again from a head of the third song which is the same song as the song before occurrence of the retrying process. On this occasion, the recording speed will be converted from the quadruple speed to the double speed, as shown in FIG. 8(D), and the recording of the third song will be started at the double speed. Specifically, the situation where the retrying process has occurred may be considered to be such situation that inaccessible state to the HDD by vibration has happened, and in order to make the buffer overflow in the recording buffer RB unlikely to happen in such situation, the recording speed will be converted from the quadruple speed to the double speed (the low speed). In this manner, such situation that the sound signals may be unlikely to be stocked excessively in the recording buffer RB will be created. It is to be noted that the encoding process is not conducted at the double speed recording, as described above. This conversion of the recording speed will be performed in the CD reproducing section 201, according to a command for converting the recording speed which is issued from the control section 200.

After the recording process of the third song at the double speed has finished, the recording speed will be again converted from the double speed to the quadruple speed to start recording of the fourth song and further songs, as shown in FIG. 8(E). The recording at the quadruple speed will be continued until the retrying process may occur. In case where the retrying process has occurred after the fourth song, the recording speed will be converted again from the quadruple speed to the double speed, and the recording will be started.

According to the recording and reproducing device in this embodiment which has been described above, the following advantages can be obtained. Specifically, because the recording speed of the headmost song after detection of the disk is set to be lower than the recording speed of the other songs, it is possible to decrease the possibility of a dropout of sound due to an overflow in the recording buffer at the time of recording the headmost song. Moreover, because the encoding process is not conducted at the low speed recording, influence of vibration can be decreased, whereby such environment that an overflow may less happen can be created.

Further, the recording and reproducing device is so constructed that at the time of the retrying process due to occurrence of an overflow of the other songs than the headmost song, the recording will be conducted at the lower speed than the preceding recording speed of the sound signals. Accordingly, it is possible to decrease such possibility that the overflow may happen again in the recording buffer during the retrying process. Still further, because the encoding process is not conducted at the low speed recording, influence of vibration can be decreased, whereby such environment that an overflow may less happen can be created. Still further, in this embodiment, because the reproducing buffer has a larger capacity than the recording buffer, it is possible to stock a larger number of the sound signals in the reproducing buffer. Therefore, as compared with a case where the reproducing buffer has the same capacity as the recording buffer, exhaustion of the sound signals in the reproducing buffer will be prevented, whereby such possibility that a dropout of the sound may occur can be decreased. In addition, it is possible to provide advantageous unit for preventing occurrence of a dropout of the sound, by employing the above described speed converting process and the encoding process combined together.

Although the invention has been heretofore described referring to the embodiment, various modifications can be made within a scope of description of the claims for patent. For example, although the sound signals in uncompressed state are used as the signals recorded on the disk in this embodiment, it is also possible to use the disk on which compressed data have been recorded. Moreover, the signals are not necessarily audio data, but image or sound signals of a DVD or the like may be used. In this case, a chapter of the DVD or the like will be used as the set of the sound signals in the head part of the disk. In short, the sound signals in the scope of claims for patent include both the image signal and the sound signal recorded on the DVD or the like, but not only the audio data.

What is claimed is:

1. A recording and reproducing device comprising:
 a single reading unit that reads sound signals recorded in a single recording medium, the sound signals including a first set of signals and a second set of signals which are different from and subsequent to the first set of signals;

a buffer unit that temporarily stores the sound signals which are read by the single reading unit;

a recording unit that records the sound signals which are temporarily stored in the buffer unit, the recording unit being different from the single recording medium;

a reproducing unit that reproduces the sound signals which are recorded in the recording unit; and a controller that automatically changes a reading speed of the single reading unit between a first reading speed and a second reading speed which is faster than the first reading speed, wherein the controller automatically changes the reading speed of the single reading unit depending on whether the single reading unit reads the first set of signals or the second set of signals from the single recording medium such that the single reading unit reads the first set of signals at the first reading speed and reads the second set of signals at the second reading speed after reading the first set of signals.

2. The recording and reproducing device as set forth in claim 1, wherein the single reading unit initially reads the first set of signals from among the sound signals recorded in the single recording medium.

3. The recording and reproducing device as set forth in claim 1, further comprising a compressing unit that compresses the sound signals which are recorded in the recording unit when the single reading unit reads the sound signals at the second reading speed.

4. The recording and reproducing device as set forth in claim 1, wherein the recording unit includes a hard disk drive.

5. The recording and reproducing device as set forth in claim 1, wherein the single reading unit reads the sound signals at the first reading speed in a case where the reproducing unit reproduces the first set of signals while the buffer unit stores the first set of signals, and wherein the single reading unit reads the sound signals at the second reading speed in a case where the reproducing unit reproduces the first set of signals while the buffer unit stores the second set of signals.

6. The recording and reproducing device as set forth in claim 1, wherein the controller automatically changes the reading speed of the single reading unit from the second reading speed to the first reading speed when a buffer overflow of the buffer unit occurs while the single reading unit reads the second set of signals at the second reading speed so that the single reading unit again reads the second set of signals at the first reading speed in a retrying process.

7. The recording and reproducing device as set forth in claim 6, wherein the controller maintains the reading speed of the single reading unit at the first reading speed when the buffer overflow of the buffer unit occurs while the single reading unit reads the first set of signals at the first reading speed so that the single reading unit again reads the first set of signals at the first reading speed in the retrying process.

8. A recording and reproducing method comprising:

reading. by a single reading unit, sound signals recorded in a single recording medium, the sound signals including a first set of signals and a second set of signals which are subsequent to and different from the first set of signals:

temporarily storing, in a buffer unit, the sound signals which are read by the reading unit;

recording, in a recording unit, the sound signals which are temporality stored in the buffer unit, the recording unit being different from the single recording medium;

reproducing, by a reproducing unit, the sound signals which are recorded in the recording unit: and automatically changing, by a controller, a reading speed of the single reading unit between a first reading speed and a second reading speed which is faster than the first reading speed, wherein:

the reading speed of the single reading unit is automatically changed by the controller depending on whether the single reading unit reads the first set of signals or the second set of signals from the single recording medium such that the first set of signals are read at the first reading speed and the second set of signals are read at the second reading speed after the first set of the signals are read.

9. The recording and reproducing method as set forth in claim 8, wherein the reading speed of the single reading unit is automatically changed by the controller from the second reading speed to the first reading speed when a buffer overflow of the buffer unit occurs while the second set of signals are read at the second reading speed so that the second set of the signals are read again at the first reading speed in a retrying process.

10. The recording and reproducing method as set forth in claim 9, wherein the reading speed of the single reading unit is maintained at the first reading speed when the buffer overflow of the buffer unit occurs while the first set of signals are read at the first reading speed so that the first set of the signals are read again at the first reading speed in a retrying process.

\* \* \* \* \*